United States Patent [19]

Greenwell

[11] Patent Number: 4,585,113
[45] Date of Patent: Apr. 29, 1986

[54] APPARATUS FOR TRANSFERRING ARTICLES

[75] Inventor: Joseph D. Greenwell, Florence, Ky.

[73] Assignee: R. A. Jones & Co. Inc., Covington, Ky.

[21] Appl. No.: 663,168

[22] Filed: Oct. 22, 1984

Related U.S. Application Data

[63] Continuation-in-part of Ser. No. 538,769, Oct. 5, 1983, abandoned.

[51] Int. Cl.$^4$ .............................................. B65G 37/00
[52] U.S. Cl. .................................. 198/347; 198/422; 198/425
[58] Field of Search ............... 198/422, 605, 580, 438, 198/425, 347, 607; 53/447, 540; 414/29, 31, 55, 61

[56] References Cited

U.S. PATENT DOCUMENTS

| | | |
|---|---|---|
| 3,520,395 | 7/1970 | Jablonski, Jr. et al. ............. 198/422 |
| 3,729,895 | 5/1973 | Kramer et al. .................. 198/422 X |
| 3,822,008 | 7/1974 | Benner, Jr. et al. ................. 414/72 |
| 3,866,741 | 2/1975 | Carbon et al. ...................... 198/422 |
| 4,212,263 | 7/1980 | Hillhouse ........................ 198/438 X |
| 4,285,621 | 8/1981 | Spencer .......................... 198/422 X |
| 4,317,656 | 3/1982 | Schulze et al. ................. 198/438 X |

FOREIGN PATENT DOCUMENTS 3201560 7/1983 Fed. Rep. of Germany ...... 198/347
1440311 12/1966 France ............................... 198/422

Primary Examiner—Joseph E. Valenza
Assistant Examiner—Jonathan D. Holmes
Attorney, Agent, or Firm—Wood, Herron & Evans

[57] ABSTRACT

An apparatus transforms a single file of articles on a conveyor into separated batches of articles on the conveyor. The batches of articles are discharged into receptacles such as product buckets. The separation of the articles into batches provides sufficient time between the batch discharges to index successive receptacles into position at the discharge end of the single file conveyor.

12 Claims, 9 Drawing Figures

APPARATUS FOR TRANSFERRING ARTICLES

This is a continuation-in-part of copending application Ser. No. 538,769, filed Oct. 5, 1983, now abandoned.

This invention relates to apparatus for transferring articles on a conveyor from a single file into successive receptacles such as product buckets of a cartoner.

The apparatus of the present invention may have application to diverse requirements for transferring articles. A specific application for which the present invention has substantial utility is that of transferring pouches from packaging apparatus to the product buckets of a cartoner.

In the transferring of batches or groups of pouches from a pouch machine such as disclosed in U.S. Pat. No. 3,597,898 into product buckets of a cartoner certain problems arise. The pouch machine might deliver as many as 1,000 pouches per minute. Let it be assumed that it is desired to pack a predetermined number of them as, for example 24, into cartons through the use of a cartoning machine. The cartoning machine has successive product buckets on a product bucket conveyor into each of which the 24 pouches must be discharged. The pouches are thereafter thrust from the product buckets into tubular cartons carried alongside the product buckets, the cartons thereafter being sealed. It is in the transfer of the 24 pouches into a product bucket and thereafter indexing the next succeeding product bucket into position that gives rise to the problem. The time interval between the last pouch of the batch and the first pouch of the next batch is too small to accomplish the indexing.

One approach to this problem is depicted in U.S. Pat. No. 4,043,442 assigned to the assignee of the present invention. In accordance with that patent, a cutoff mechanism for the pouch machine delivers batches of pouches in shingled orientation alternately to side-by-side lanes. By putting batches of pouches first in one lane and then another, a gap in each lane approximately equal to the length of a batch is created. The patent further discloses check and release mechanisms as well as slow and fast conveyors for the pouches which align the side-by-side batches of pouches and increase the length of the gap between leading groups and trailing groups of pouches.

The apparatus of the patent works satisfactorily for many applications. However, for some applications there are disadvantages. For example, since the batches are created at the pouch-forming machine, as the pouch is delivered in shingled orientation to the conveyors, if one pouch is faulty, the complete load must be removed rather than the single offending pouch. Because, to create the gap, it is necessary to create side-by-side lanes of groups of pouches.

If the count is changed, there is a significant amount of time involved in retiming the conveyor system in order to accommodate the apparatus for the new count of pouches to be cartoned.

It has been an objective of the invention to provide an improved transfer mechanism. More specifically, it has been an objective of the invention to provide a transfer mechanism which receives a single file of pouches, creates batches of preselected numbers of pouches and discharges the batches into successive receptacles such as product buckets.

Another objective of the invention has been to provide a transfer mechanism wherein the number of pouches in each batch can be changed in a very quick and simple manner.

Another objective of the invention has been to provide transfer apparatus in which a single defective pouch can be rejected before it gets onto the pouch conveyor and associated transfer apparatus.

Another objective of the invention is to provide transfer apparatus which is more suitable for a high count of pouches, e.g., twenty-four to a carton, than the prior apparatus.

These objectives of the invention are attained by providing a conveyor which receives the pouches in single file and in longitudinally-spaced relation. A diverter removes a preselected number of leading pouches of an incoming batch and returns them onto or adjacent the trailing pouches of the batch. In this fashion, the batch is "compressed" longitudinally to create a gap between batches at least equal to the number of pouches diverted. That gap which may be 5–10 cycles represents an interval of sufficient duration to permit the indexing of a product bucket or other receptacle during the interval.

In a preferred embodiment of the invention, the diverter consists of a wheel having a periphery which moves in the same direction and overlies the single file conveyor of pouches. The wheel carries a plurality of uniformly-sapced vacuum cups whose movement is timed with respect to the single file conveyor, the vacuum cups being positioned to pick up pouches from the single file conveyor, carry them around the circumference of the wheel and deposit them onto incoming pouches, thereby creating the compressed batch.

A counter is provided to count out the number in the batch, and after the count is achieved, to initiate the operation of the diverter wheel. A cycle counter is also provided along with means for varying the count of pouches forming the diverted group. An appropriate setting of the two counters permits the varying of the batch size within fairly wide limits.

For example, if a count of 24 to a batch is desired, the product counter is set at 24 and the cycle counter may be set at 10. At the beginning of the establishing of each batch, the diverter wheel is operated to pick up incoming pouches 1–10 and to release those ten incoming pouches sequentially on top of pouches 11–20 of the batch and thereafter to discontinue operation. It is during this pick up and deposit by the diverter wheel that an empty product bucket is indexed into position at the discharge end of the single file conveyor. The product counter continues to count until a batch of 24 has been counted. When 24 have been counted, the diverter wheel will be restarted to begin the accumulation of the next batch.

It does not matter that there might be missing pouches in the incoming group as may be caused by rejection of faulty pouches. The diverter wheel will simply pick up less than its maximum group, but the final count in the batch will not be short for the product counter will not start a new group and hence index the new product bucket until a count of 24 actual pouches is achieved.

A count of less than 20 in a batch is attainable with a 10 position diverter wheel. If 15 is to be the batch count, for example, the cycle counter could be set for a 5 pouch count and the product counter set to a count of 15. The diverter wheel under these conditions would pick up pouches 1-5. Pouches 6-10 would pass under the diverter wheel and pouches 1-5 would be deposited respectively on pouches 11-15, thus making up a batch of 15 with a 5 cycle interval for indexing.

It has been another objective of the invention to provide alternative embodiments of the diverter described above. For example, the diverter may be formed as an endless conveyor overlying the conveyor carrying incoming pouches. The conveyor has a series of spaced lugs which form compartments for receiving the articles. Guides surrounding at least portions of the overhead conveyor confine articles diverted to it onto the endless conveyor. A selectively-operable mechanism may be employed to cause incoming articles to move up from the incoming conveyor into the space between the guides and the overhead conveyor so as to divert such articles from the incoming conveyor onto the endless overhead conveyor. One such mechanism can be a plate pivotally mounted between a horizontal attitude which permits articles to pass beyond the overhead conveyor and an upwardly-inclined attitude which diverts articles from the incoming conveyor onto the guides of the overhead conveyor. Alternatively, air jets may be selectively operated to drive articles upwardly from the incoming conveyor onto the guides for the overhead conveyor.

Still another alternative embodiment employs an endless overhead conveyor similar to that described above having lugs forming a series of spaced compartments. The mechanism for diverting the articles from the incoming conveyor onto the overhead conveyor includes a wheel having a plurality of suction cups spaced around its perimeter. The suction cups engage the articles, raise them above the incoming conveyor and, through rotation of the wheel, bring the articles into the position between the guides and the compartments of the overhead conveyor.

The several objectives and features of the present invention will become more readily apparent from the following detailed description taken in conjunction with the accompanying drawings in which.

Figure 1:
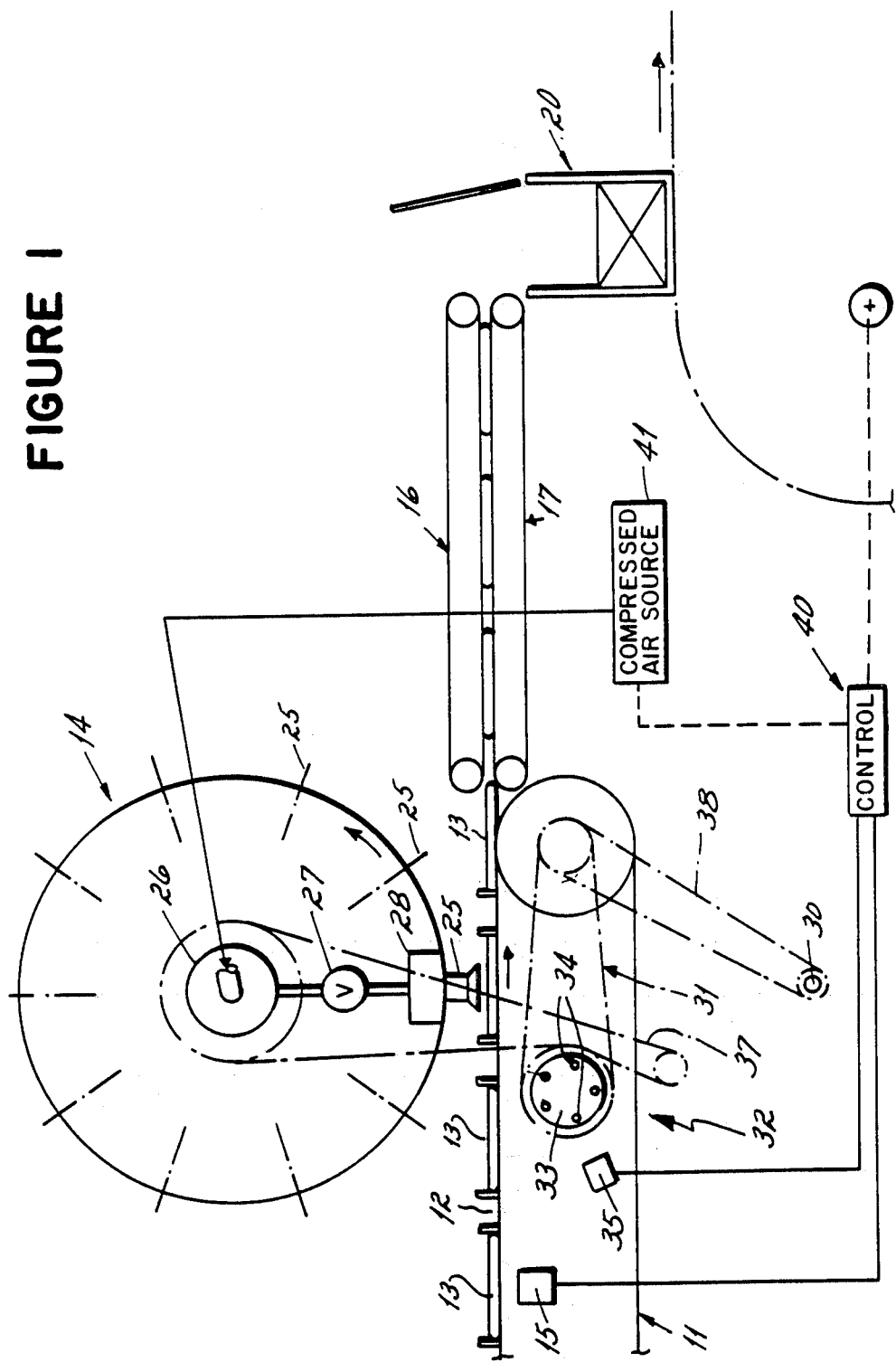
FIG. 1 is a diagrammatic, side-elevational view of the invention.

Referring particularly to FIG. 1, the transfer apparatus includes a suitable frame (not shown) on which the principal operating elements are mounted. An endless conveyor 11 is mounted on the frame and has an upper run 12 which carries pouches 13, one at a time, under a vacuum wheel 14. An electric eye 15 counts each pouch as it passes by the electric eye.

Upper and lower transfer belts 16 and 17 are located at the downstream end of the conveyor 11 to receive the pouches delivered between the belts by the conveyor 11. A product bucket conveyor 20 is located at the downstream end of the belts 16 and 17 to receive the pouches delivered from the belts.

The vacuum wheel 14 overlies the conveyor 11 and is driven in timed relation to it. In the illustrated form of the invention, the vacuum wheel 14 has ten vacuum cups 25 uniformly spaced around the periphery of the wheel. The vacuum cups are spaced with respect to the conveyor 11 so as to be able to engage a pouch on the conveyor 11, remove it, carry it through 360° of revolution of the vacuum wheel 14 and deposit it at a new position on the conveyor 11.

The vacuum wheel has a source of compressed air entering at its hub 26. It is distributed through suitable valves 27 to Venturi blocks 28, one Venturi block being connected to each suction cup. The Venturi block is a conventional element which, when compressed air passes through it, creates a vacuum at the suction cup.

A suitable cam (not shown) on the vacuum wheel, causes the valves to operate to create a vacuum when the cups 25 engage a package and to maintain that vacuum until the cups have almost completed a 360° revolution of the vacuum wheel. At that point, the vacuum is cut off so that pouches carried by the suction cups are dropped onto the conveyor 11 on top of incoming pouches.

The drive for the system is from the pouch feeder or alternately from the cartoner with which it is associated, the drive being indicated at 30. A chain 38 connects the drive from the cartoner to the conveyor 11. A drive chain 31 connects the conveyor 11 to a cycle counter 32 which consists of a wheel 33 having five holes 34, each hole corresponding to one cycle of the apparatus. An electric eye 35 aligned with the holes 34 takes the count of the cycle. The drive is transmitted through a chain 37 to the vacuum wheel 14.

Figure 2:
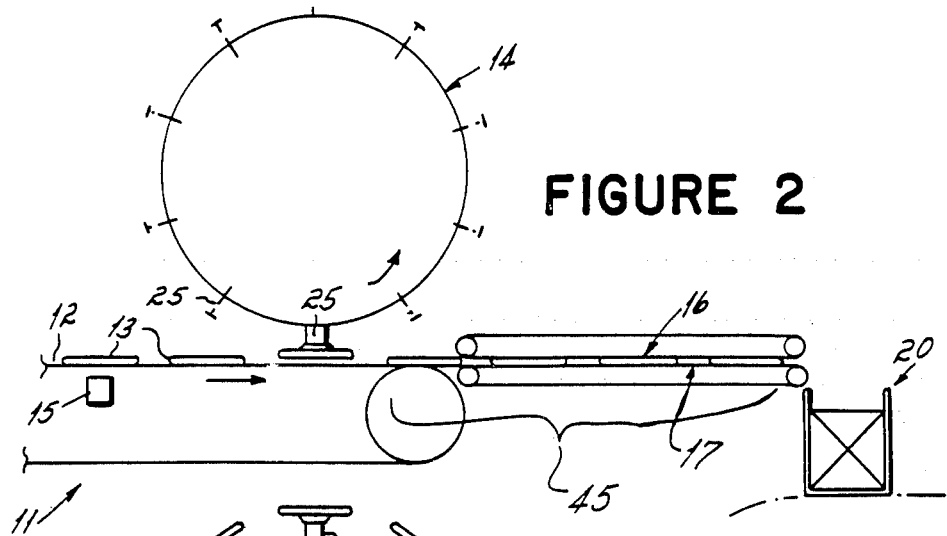
FIGS. 2 through 4 are views depicting one typical operation sequence.
Figure 3:
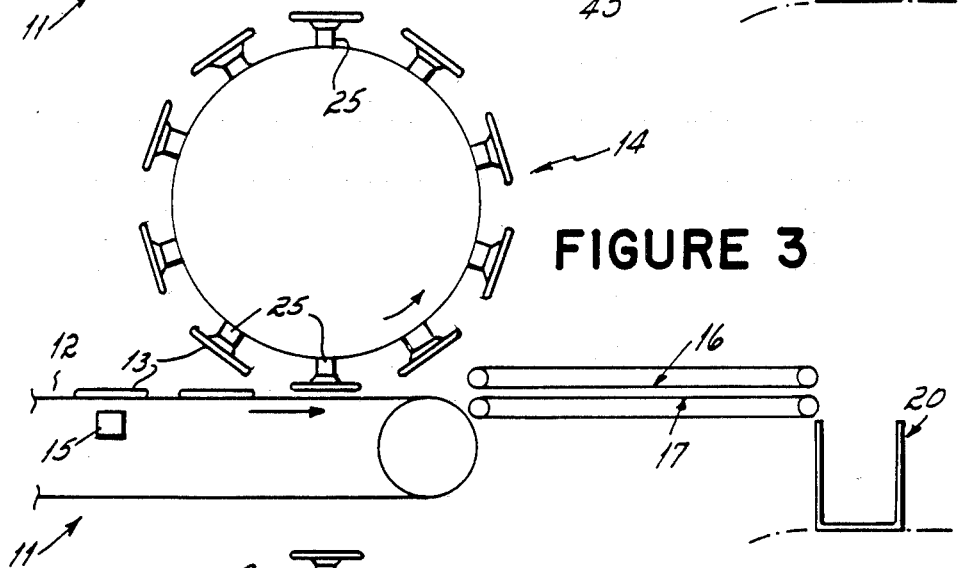
Figure 4:
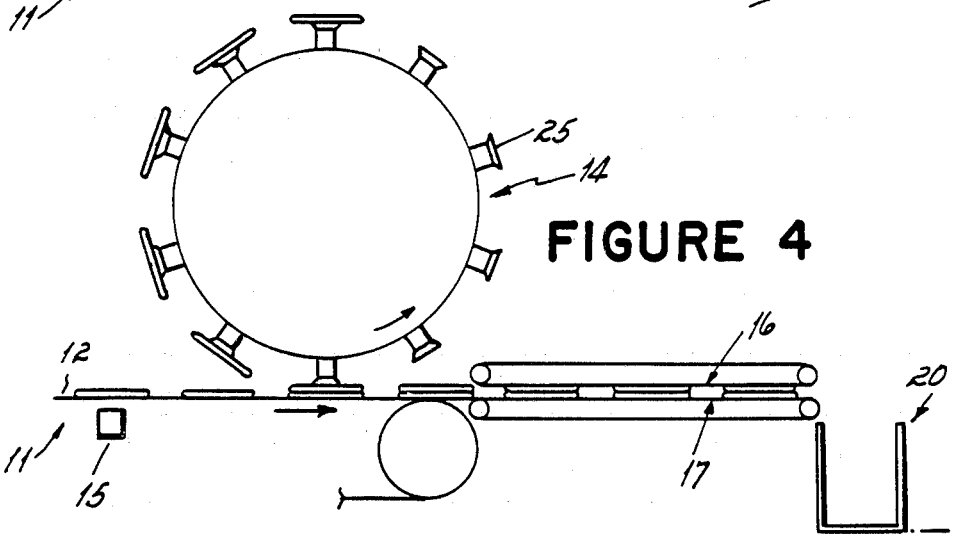

A control 40 which can be set for different carton counts is connected to the pouch counter 15, the cycle counter 35, the compressed air supply 41 and a mechanism for indexing the product buckets into position at the discharge end of the belts 16 and 17. With this system, the operation is as follows:

The operation of the apparatus may be best understood by reference to FIGS. 2, 3 and 4. Let it be assumed that in the illustrated example a count of 24 pouches is to be deposited in the product bucket 20. Let it also be assumed that there are twenty pouches in the product bucket and four more indicated at 45 coming from the conveyor 11. At this point, the counter 15 has told the control 40 that the count of twenty-four has been completed. The control applies vacuum to the vacuum wheel 14 so that after the twenty-fourth pouch passes the vacuum wheel, vacuum is applied to the next incoming pouch. The vacuum wheel is programmed in the control 40 to apply vacuum to the next ten incoming pouch positions on the conveyor 11. It does not matter if there is no pouch in any of the first ten positions, for the purpose is to create a ten-cycle pause in the delivery of pouches to the product bucket so that the next product bucket can be indexed into position.

After a count of about four cycles which is sufficient time for the last of the twenty-four pouches to clear the upper and lower belts 16 and 17, the product bucket 20 is indexed into position. Meanwhile, as indicated by FIG. 3, the vacuum wheel 14 is picking up ten pouches, assuming that each incoming station of conveyor 11 has a pouch in it. After a count of ten cycles as determined by the cycle counter 35, the vacuum to the suction cups 25 will be discontinued as each cup makes its deposit of its pouch on the conveyor 11. Thus, as depicted in FIG. 4, the vacuum wheel deposits a pouch on top of a pouch until all pouches on the vacuum wheel 14 have been deposited. Under ideal conditions of all stations on the conveyor 11 being full, ten pairs of pouches will be delivered to the product bucket 20 followed by four single pouches, as illustrated in FIG. 2. After the counter 15 has determined that twenty-four pouches have passed it, it signals the control to apply vacuum to the vacuum wheel 14 as soon as the twenty-fourth pouch has passed under it. From this point a new sequence of operations is begun to group another twenty-four pouches. Reference has been to depositing pouches "onto" incoming pouches. It should be understood that in some instances, pouches will be deposited alongside or adjacent to other pouches and that such operations are within the scope of the invention.

It should be understood that even if some of the stations in the conveyor 11 are empty, the apparatus will nevertheless deliver twenty-four pouches to the product bucket before a new product bucket is indexed, for it is the pouch counter 15 determining that twenty-four pouches have been detected that controls the start of the indexing of a new product bucket.

It should also be understood that by making an appropriate setting of the control 40 a different count can be produced. For example, let it be assumed that a count of fifteen pouches to the carton is desired. The control would be set to apply vacuum to pouches 1 through 5. Vacuum to pouches 6–10 would be discontinued. The pouches 1–5 would be deposited upon pouches 11–15. Thus, a count of fifteen could be achieved.

It should also be understood that while a ten cup vacuum wheel 14 is illustrated, the vacuum wheel could have any number of cup positions within practical limits.

Figure 5:
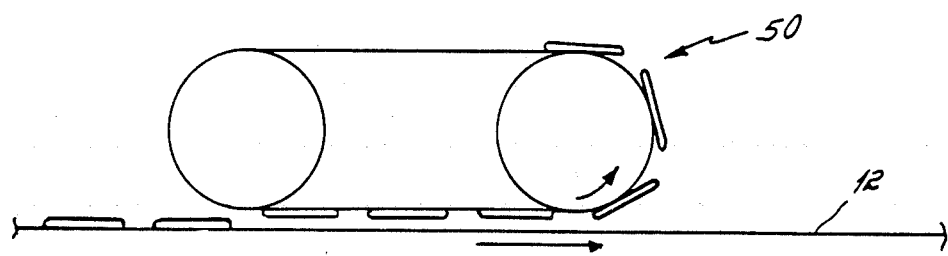
FIGS. 5-9 are fragmentary diagrammatic views of other embodiments.

It should be further understood that the invention is not restricted to a vacuum wheel as depicted by wheel 14. For example, as shown in FIG. 5, the vacuum wheel could be replaced by an endless belt 50 with suitable means for applying vacuum to the suction cups.

Figure 6:
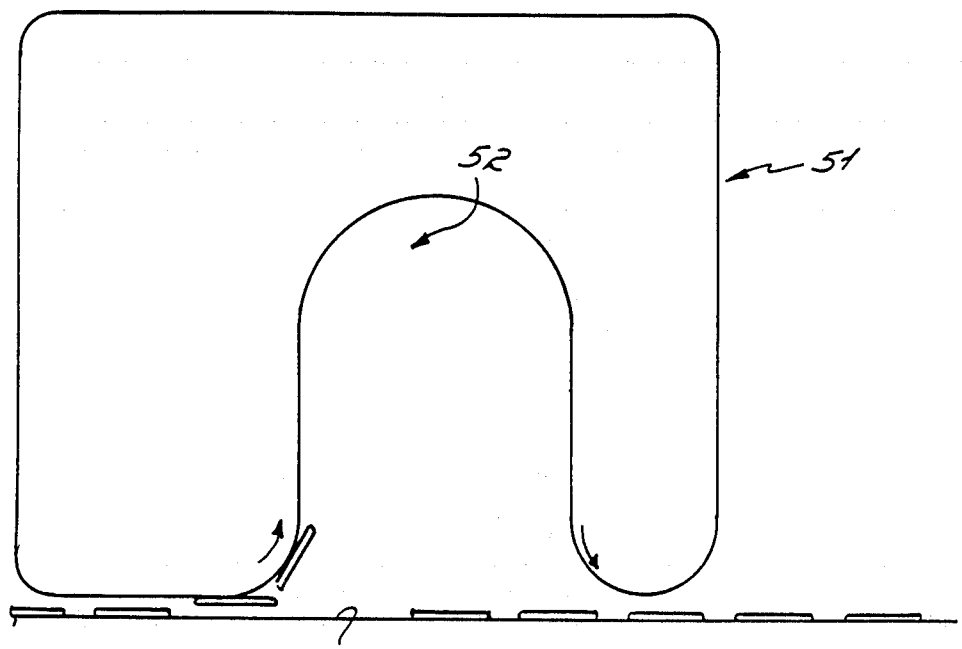

Still another alternative is depicted in FIG. 6 wherein an endless conveyor 51 has an inverted U-shaped transfer path 52 which serves to divert pouches for a plurality of cycles, seven being shown, to provide time for indexing of the product bucket or other receptacle receiving the pouches.

Further, it is considered to be within the scope of the invention to provide a mechanism other than vacuum cups to pick up the pouches. For example, articulated grippers could be employed to pick up the leading or trailing edges of the pouches to divert them in substantially the same manner as does the vacuum wheel.

Further, a mechanism could be provided for picking up more than one pouch for each station on the diverter and depositing such pouches onto the incoming pouches so as to stack three or more in each position of the pouch conveyor.

Figure 7:
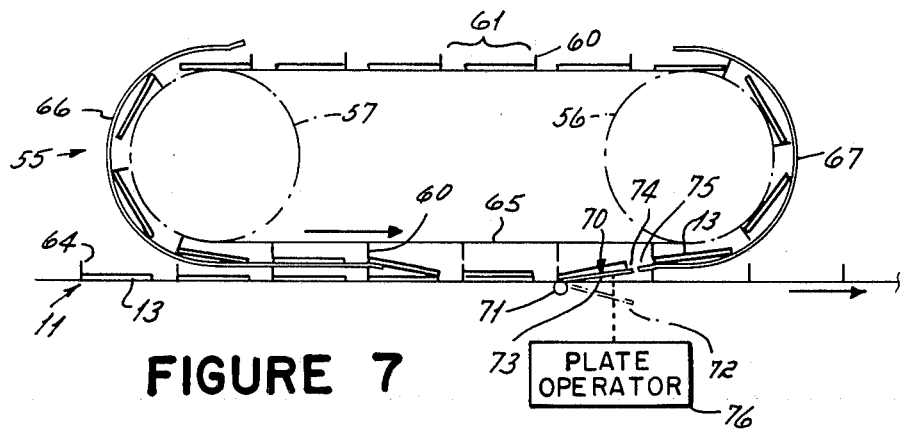

FIG. 7 shows another alternative example of a diverter utilizing the principles of the present invention. The incoming conveyor is shown at 11. An endless overhead conveyor 55 oriented generally in a vertical plane passes around two wheels 56 and 57. If the conveyor is a chain conveyor, the wheels 56 and 57 will be in the form of sprockets and two or more chains will be located side by side. The conveyor 55 contains a series of spaced lugs 60 which form compartments 61 between the lugs. The compartments are adapted to receive articles 13. The incoming conveyor also has lugs 64 which move in alignment with the lugs 60 as the lower run 65 of the overhead conveyor passes adjacent the incoming conveyor 11. An upstream guide 66 is formed around the upstream end of the overhead conveyor and a downstream guide 67 is formed around the downstream end of the overhead conveyor. The articles 13 are confined within the compartments 61 between the guides 66 and 67 and the conveyor 55 against the force of gravity which would tend to dislodge the articles from the compartments.

A plate 70 is mounted adjacent the incoming conveyor 11. The plate is pivoted at 71 and is adapted to move from the broken line position at 72 to the full line position at 73. In the broken line position 72, which is a normal position, the plate is out of the path of incoming articles. In the inclined position 73, the plate has an end 74 which is in alignment with the end 75 of guide 67.

An operator 76 for the plate 70 is provided to effect the movement of the plate between its normal out-of-the-way position and the inclined operative position. That plate would be operated by a control similar to the control system indicated at 40 in FIG. 1 the control operating the plate rather than the vacuum source.

Incoming articles, moved by the lugs 64 of the incoming conveyor, will ride up the plate 70 and onto the guide 67. As soon as an article is forced onto the guide 67, it will be engaged at its upstream edge by a lug 60 of the overhead conveyor and be thus lodged in the compartment 61 defined by the adjacent lugs 60.

Thus, without the use of suction cups with the complexity required to control the vacuum to the suction cups, a selected number of articles can be transferred from the incoming conveyor, diverted around the overhead conveyor and then be deposited onto incoming articles to form the desired double layer of articles.

Figure 8:
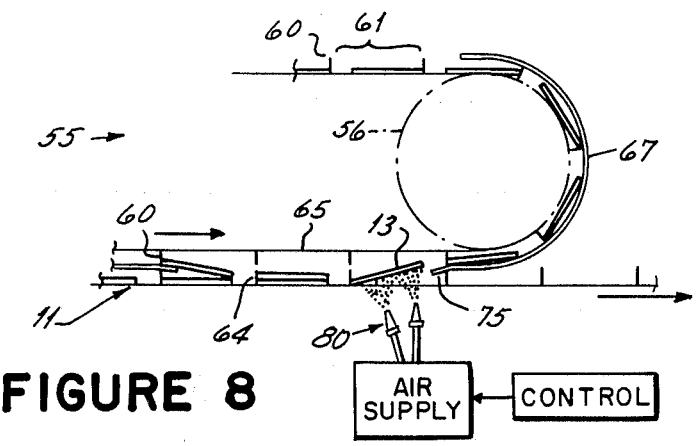

Still another alternative embodiment is shown in FIG. 8. All of the elements in FIG. 8 are the same as those in FIG. 7 except for the diverter plate. In the embodiment of FIG. 8, there is no diverter plate. Rather, one or more air nozzles 80 are provided to simply blow the article up away from the incoming conveyor 11 and onto the guide 67 where the article becomes confined between the adjacent lugs 60 of the overhead conveyor 55.

Figure 9:
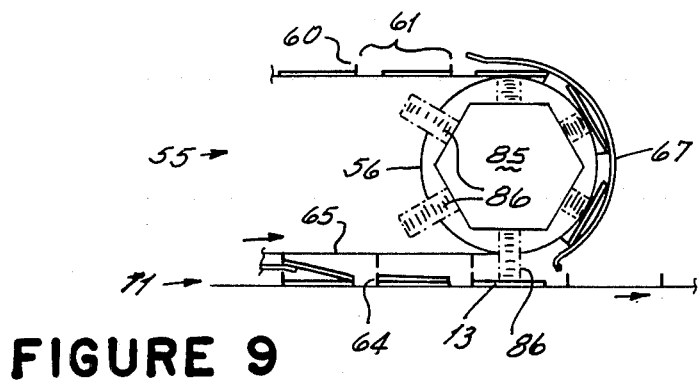

Still another embodiment is illustrated in FIG. 9. Again, the elements of the embodiment of FIG. 9 are substantially the same as those of FIGS. 7 and 8 except for the diverter plate. In FIG. 9, a wheel 85 is fixed to the wheel 56, the wheel 85 having equiangularly-spaced suction cups 86 located around its periphery. A control means, not shown, is operable to apply vacuum to the suction cups to positively engage incoming articles 13 and to lift them off the incoming conveyor 11. Rotation of the wheel 85 carries the articles 13 into the space between the conveyor 55 and the guide 67. As soon as the articles are lodged between the guide and the conveyor, the vacuum may be released. While the application of vacuum to the suction cups of FIG. 9 is somewhat more complicated than the use of the diverters of FIGS. 7 and 8, it is less complicated than the vacuum system required for the embodiment of FIG. 1 and it provides positive assurance of the capturing of the articles and the placing of them in position between the guides and the overhead conveyor.

In all of the embodiments, a control system similar to that of the embodiment of FIG. 1 is employed to provide assurance that the correct number of articles is deposited in the product bucket and that sufficient time is provided for indexing the next incoming product bucket into position.

Having described my invention, I claim:

1. Apparatus for transferring articles from a single file conveyor having uniformly spaced positions for articles to groups of at least two articles and to create batches of articles of a predetermined number with preselected spacing between batches whether or not the single file of articles has an article in each of the spaced positions, comprising:
- a first conveyor for conveying articles in longitudinally-spaced file positions,
- a diverter for temporarily removing from said single file as many articles as are necessary to create the preselected spacing between batches,
- said diverter returning said articles to said first conveyor and depositing them onto or adjacent to undiverted articles which are carried on said first conveyor,
- an article counter to count the number of articles passing single file upstream of said diverter, said article counter triggering the operation of said diverter after a predetermined batch of articles has been counted,
- a cycle counter for counting a preselected number of said single file positions,
- means associated with said cycle counter for terminating the diverting actions of said diverter after a preselected number of diverting actions has been completed, thereby creating the preselected spacing between batches,
- whereby the article counter assures that there is a desired number in each batch and thereupon triggers the operation of said diverter, and whereby said cycle counter, controlling the number of diverter actions, assures that there is a preselected number of empty article positions between batches.

2. Apparatus for transferring articles as in claim 1 further comprising:
- a plurality of receptacles for receiving batches of articles;
- means for indexing said receptacles, one at a time, to the discharge end of said first conveyor;
- said indexing means operating only during the interval between discharged batches of articles, said interval being created by the diversion of articles.

3. Apparatus as in claim 1 in which said diverter comprises:
- a wheel overlying said first conveyor;
- vacuum cups uniformly spaced about said wheel;
- means timing said wheel to said first conveyor to pick up articles one at a time as they pass under said wheel.

4. Apparatus as in claim 1 in which said first conveyor has a plurality of longitudinally-spaced lugs for receiving one article between pairs of spaced lugs, the spacing of the centers of each pair of said lugs corresponding to one cycle of the apparatus;
- said diverter comprising:
- a wheel overlying said first conveyor;
- vacuum cups uniformly spaced about said wheel; and
- means timing said wheel to said first conveyor to pass a vacuum cup between each pair of lugs.

5. Apparatus as in claim 1 in which said diverter comprises:
- a wheel overlying said first conveyor, the periphery of said wheel being oriented to move in the direction of said first conveyor;
- a plurality of article-grasping devices uniformly spaced about the periphery of said wheel and engageable with articles on said first conveyor;
- and means for rotating said wheel in timed relation to said first conveyor to pick up a selected number of articles from said first conveyor.

6. Apparatus as in claim 1 in which said diverter comprises:
- an endless belt having a plurality of article-grasping devices uniformly spaced along its length,
- said belt having a lower run extending parallel to and overlying said first conveyor;
- and means for driving said belt and first conveyor in timed relation to each other.

7. Apparatus as in claim 6 in which the lower run of said endless belt has an inverted U-shaped loop in which said belt moves away from said first conveyor and then returns to said first conveyor.

8. Apparatus as in claim 1 in which said diverter comprises,
- an endless conveyor overlying said first conveyor and having a path of movement in a vertical plane,
- said conveyor having a series of spaced compartments for receiving and conveying articles,
- guides positioned adjacent at least a portion of said endless conveyor to confine received articles within their respective compartments,
- and means for directing articles from said first conveyor into said compartments on said endless conveyor.

9. Apparatus as in claim 8 in which said directing means comprises,
- a wheel rotatable about a horizontal axis and overlying said first conveyor,
- vacuum cups spaced around the perimeter of said wheel,
- said vacuum cup picking up articles from said first conveyor and placing them in compartments on said endless conveyor.

10. Apparatus as in claim 8 in which said directing means comprises,
- a normally horizontal plate pivoted adjacent said first conveyor and having a free end pivotable to an operative position adjacent a guide and in the path of articles on said first conveyor,
- means for pivoting said plate to said operative position whereby articles on said first conveyor ride up said plate and onto said guide where they are received and conveyed by said endless conveyor.

11. Apparatus as in claim 8 in which said directing means comprises,
- at least one upwardly-directed air nozzle disposed below said first conveyor adjacent a guide,
- means for applying air under pressure to said nozzle when an article to be diverted passes over it,
- said air raising said article onto said guide where it is received and conveyed in a compartment on said endless conveyor.

12. Apparatus as in claim 8 in which said first conveyor has spaced upwardly-projecting lugs forming compartments within which articles are conveyed,
- said endless conveyor having two spaced wheels on horizontal axes about which said conveyor passes,
- said endless conveyor having outwardly-projecting lugs,
- said endless conveyor having a lower run which carries its lugs in substantial alignment with and close to the lugs on said first conveyor so that articles which are urged upwardly away from said first conveyor lugs will be captured by said endless conveyor lugs.

* * * * *

UNITED STATES PATENT AND TRADEMARK OFFICE
CERTIFICATE OF CORRECTION

PATENT NO. : 4,585,113
DATED : April 29, 1986
INVENTOR(S) : Joseph Daniel Greenwell It is certified that error appears in the above-identified patent and that said Letters Patent is hereby corrected as shown below:

Column 2, line 29, "sapced" should be -- spaced --

Column 7, line 4, after "nally-spaced," insert -- single --

Signed and Sealed this

Twelfth Day of August 1986

[SEAL]

Attest:

DONALD J. QUIGG

Attesting Officer

Commissioner of Patents and Trademarks